(12) United States Patent
Hirai et al.

(10) Patent No.: US 8,015,586 B2
(45) Date of Patent: Sep. 6, 2011

(54) IMAGE DISPLAY METHOD, IMAGE DISPLAY DEVICE, AND IMAGE DISPLAY PROGRAM

(75) Inventors: Seiichi Hirai, Koshigaya (JP); Shinya Ogura, Kodaira (JP); Takashi Mito, Kodaira (JP); Shigeyuki Murata, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 931 days.

(21) Appl. No.: 10/587,454

(22) PCT Filed: Jan. 27, 2005

(86) PCT No.: PCT/JP2005/001113
§ 371 (c)(1),
(2), (4) Date: Jul. 27, 2006

(87) PCT Pub. No.: WO2005/074274
PCT Pub. Date: Aug. 11, 2005

(65) Prior Publication Data
US 2007/0124782 A1    May 31, 2007

(30) Foreign Application Priority Data

Jan. 29, 2004    (JP) .................................. 2004-022106

(51) Int. Cl.
*H04N 7/173*    (2011.01)

(52) U.S. Cl. .................... 725/105; 386/239; 386/248
(58) Field of Classification Search ................ 386/45, 386/46, 95, 96, 125, 126
See application file for complete search history.

(56) References Cited

U.S. PATENT DOCUMENTS

| 6,323,897 | B1* | 11/2001 | Kogane et al. ................. 348/159 |
| 6,618,074 | B1* | 9/2003 | Seeley et al. .................. 348/143 |
| 7,250,964 | B2* | 7/2007 | Handa ........................... 348/143 |
| 7,423,670 | B2* | 9/2008 | Kawai et al. ............. 348/211.99 |
| 2002/0071056 | A1 | 6/2002 | Iwata et al. |
| 2003/0091327 | A1* | 5/2003 | Hashimoto et al. ............. 386/46 |

FOREIGN PATENT DOCUMENTS

| JP | 2001-339686 | 12/2001 |
| JP | 2003-153196 | 5/2003 |
| JP | 2003-274383 | 9/2003 |
| JP | 2003-319378 | 11/2003 |

* cited by examiner

*Primary Examiner* — Jamie Atala
(74) *Attorney, Agent, or Firm* — Brundidge & Stanger, P.C.

(57) ABSTRACT

An image reproduction function for reproducing effectively reproducing image recorded in a storage device in diversified forms is provided. A moving picture obtained from one image pickup device is recorded in a plurality of systems at different frame rates. The recorded moving picture is formed of a plurality of still picture data. When reproducing the recorded moving picture, the still picture data forming a moving picture of either one of the systems are reproduced according to a time axis serving as reference for reproduction of the recorded moving picture.

6 Claims, 12 Drawing Sheets

FIG. 11A
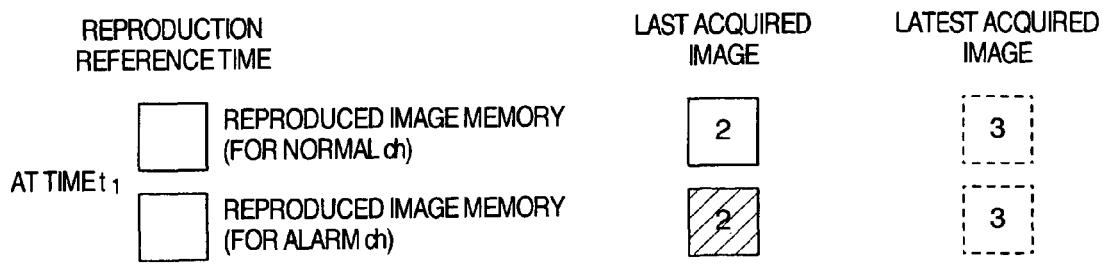
FIG. 11B
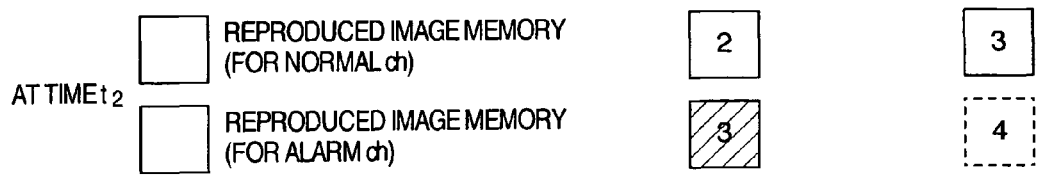
FIG. 11C
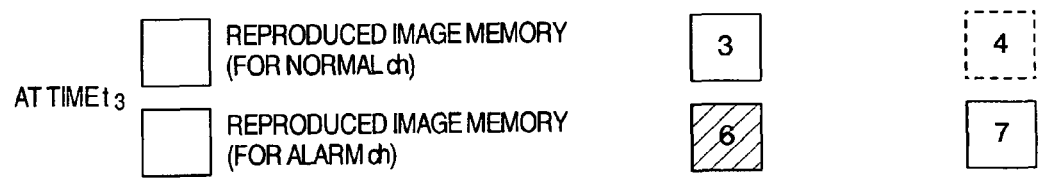
FIG. 11D
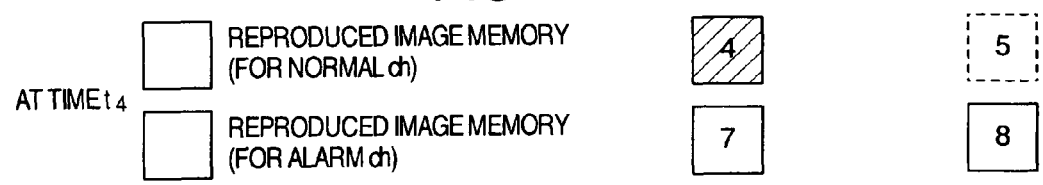

FIG. 14

| ALARM NO. | ALARM PICTURE RECORDING START TIME | ALARM PICTURE RECORDING START FRAME NUMBER | ALARM PICTURE RECORDING END TIME | ALARM PICTURE RECORDING END FRAME NUMBER |
|---|---|---|---|---|
| 1 | 2004/1/09 23:10:00 | 1 | 2004/1/09 23:12:05 | 7 |
| 2 | 2004/1/10 12:39:00 | 8 | 2004/1/10 12:40:30 | 12 |
| 3 | — | — | — | — |
| 4 | — | — | — | — |
| ⋮ | | | | |

IMAGE DISPLAY METHOD, IMAGE DISPLAY DEVICE, AND IMAGE DISPLAY PROGRAM

INCORPORATION BY REFERENCE

The present application claims priority of Japanese Patent Application No. 2004-022106 filed on Jan. 29, 2004, and the content of which is incorporated herein by reference.

TECHNICAL FIELD

The present invention relates to an image reproduction method. In particular, the present invention relates to an image reproduction method for effectively reproducing image data recorded, for example, in diversified forms.

BACKGROUND ART

With the spread of network communication, a system in which a user in a remote place can display a picture (such as a moving picture, a still picture, or an intermittent quasi-moving picture having consecutive still pictures in a time series manner) picked up by a camera on a screen by using a client device such as a personal computer or a mobile tool is put into operation.

Such a system is utilized in various uses. For example, such a system is utilized as a surveillance system for monitoring an intruder or an abnormality in a management subject (see, for example, JP-A-2003-274383).

DISCLOSURE OF THE INVENTION

Problem to be Solved by the Invention

As for delivery of image data to a client device, typically image data picked up by a camera is stored in a server and the image data is delivered from the server to the client device. However, it is expected that the recording form of image data stored in the server is diversified in the future to improve the convenience of the user as the system described above spreads. For example, even if image data is video data obtained from the same camera, qualities (such as the resolution, compression factor and frame rate (fps: frame per second)) are changed in some cases according to the time zone, occurrence of a specific abnormality or the like by considering the communication load of the network, the storage capacity of the server, or the like.

However, the conventional system is not sufficient for effectively reproducing image data recorded in diversified forms.

In view of the foregoing situations, the present invention has been achieved. An object of the present invention is to provide an image reproduction method for effectively reproducing image data recorded, for example, in diversified forms.

Means for Solving the Problem

In an image reproduction method according to the present invention, a moving picture obtained from one image pickup device is recorded in a plurality of channel lines by using a plurality of different frame rates and the recorded moving picture is reproduced. The recorded moving picture includes a plurality of still picture data. The still picture data that forms a moving picture of one channel line in the channel lines is reproduced in accordance with a time axis that serves as a reference for reproducing the recorded moving picture.

Here, "record in a plurality of channel lines" refers to record a video image obtained from one image pickup device into a plurality of channels in one recording device or in different recording devices under different video conditions, or record a video image obtained from one image pickup device in a situation similar to them.

Here, "video condition" refers to, for example, the resolution and the compression factor, besides the frame rate.

In the description in the present specification, the term "image" is used. For example, however, the term "video image" is also a similar term, and it is incorporated in the present invention.

In the description in the present specification, the term "reproduction" is used. For example, however, the term "display" or "perusal" is also a similar term, and it is incorporated in the present invention.

In the description in the present specification, the term "recording" or "storage" is used. For example, however, the term "record" or "image recording" is also a similar term, and it is incorporated in the present invention.

If the still picture data that form moving pictures of at least two channel lines among channel lines are image data generated at the same time, then the still picture data that forms a moving picture of a channel line having a high frame rate is reproduced, according to the image reproduction method of the present invention.

Here, it may be determined considering, for example, time corresponding to an error caused when providing image data with time information, whether times of the generated image data are "the same time."

While the still picture data that forms a moving picture of a channel line having a high frame rate is consecutively present, the still picture data that forms the moving picture of the channel line having the high frame rate is reproduced, according to the image reproduction method of the present invention.

In an image reproduction method according to the present invention, a moving picture obtained from one image pickup device is recorded in a plurality of channel lines by using at least one of different frame rates, different compression factors, and different resolutions and the recorded moving picture is reproduced. The recorded moving picture includes a plurality of still picture data. The still picture data that forms a moving picture of one channel line in the channel lines is reproduced in accordance with a time axis that serves as a reference for reproducing the recorded moving picture.

If the still picture data that form moving pictures of at least two channel lines among channel lines are image data generated at the same time, then the still picture data that forms a moving picture of a channel line having a high frame rate, a low compression factor, or a high resolution is reproduced, according to the image reproduction method of the present invention.

While the still picture data that forms a moving picture of a channel line having a high frame rate, a low compression factor, or a high resolution is consecutively present, the still picture data that forms the moving picture of the channel line having the high frame rate, the low compression factor, or the high resolution is reproduced, according to the image reproduction method of the present invention.

Advantages of the Invention

According to the image reproduction method of the present invention, image data recorded, for example, in diversified forms can be effectively reproduced as heretofore described.

BEST MODE FOR CARRYING OUT THE INVENTION

An embodiment according to the present invention will be described with reference to drawings.

Hereafter, an embodiment of the present invention will be described with reference to the drawings.

FIG. 1 shows an embodiment of a general configuration of an image storage and delivery system to which the image reproduction method according to the present invention is applied.

The image storage and delivery system in the present embodiment includes an image storage and delivery server 1 provided with a random-accessible recording device (hereafter referred to as disk device) 3 for storing image (including voice in some cases) data, a plurality of web cameras (5-1 to 5-n) connected to the image storage and delivery server 1 via a network 4, and a plurality of client terminals 6 (6-1 to 6-m).

In the image storage and delivery system according to the present embodiment, image data from one web camera 5 is divided into a plurality of channels (in the present embodiment, two channels) and recorded according to the recording mode. Therefore, each of the web cameras 5-1 to 5-n has a plurality of unique channel numbers. For example, the web camera 5-1 is a web camera for channel 1 (ch1) and channel 2 (ch2), ..., and the web camera 5-n is a web camera for channel p-1 (chp-1) and channel p (chp). Here, each of n, m and p is a natural number. It is not always necessary to satisfy the relation n=m=p, but the combination of them can be selected arbitrarily.

Image data of each frame in video images picked up by the web cameras 5-1 to 5-n is compressed according to an image compression technique such as JPEG and transmitted to the image storage and delivery server 1 in an IP packet form. In this case, the compressed image data becomes variable length data which differs in data quantity from frame to frame. The image storage and delivery server 1 extracts compressed image data (hereafter referred to simply as image data) from packets received from the web cameras 5-1 to 5-n via the network, and stores the image data in storage areas 30 (30-1 to 30-p) previously secured in the disk device 3 so as to be associated with the channels, respectively.

As a result, an image of one web camera 5 is stored in each storage area 30 in a time series manner. At the time of recording, a frame number is assigned to each image data every frame for the purpose of control. In the image storage and delivery system, it is also possible to use a device having a function obtained by integrating the function of the image storage and delivery server 1, the function of the disk device 3 and so on.

Each client terminal 6 requests the image storage and delivery server 1 to deliver image data by specifying a channel number and a frame number. In response to a request from the client terminal, the image storage and delivery server 1 serves to deliver image data having the specified channel number/frame number read out from the disk device 3 to the client terminal 6 of the request origin in an IP packet form. As a result, each client terminal 6 can reproduce image data recorded in the disk device 3.

The image reproduction method according to the present invention is applied in the case that the client terminal 6 requests the image storage and delivery server 1 to deliver image data and reproduces the image data on a monitor of the client terminal 6.

As recording modes mounted on the image storage and delivery system, there are three kinds, i.e., scheduled picture recording, manual picture recording and alarm picture recording according to difference in trigger cause.

In the scheduled picture recording, image data from the web camera 5 is recorded in accordance with a time table preset by a user. In the manual picture recording, the user who is monitoring an image on the monitor of the client terminal 6 records image data supplied from a web camera 5 at arbitrary timing by conducting GUI operation (such as pressing of a picture recording button) on the client terminal 6. In the alarm picture recording, image data supplied from the web camera 5 is recorded in response to an alarm signal input to the web camera 5 (such as contact input from an external sensor or intruder sensing conducted by image recognition processing).

Recording modes other than these three recording modes may be used. In the ensuing description, the schedule picture recording and the manual picture recording are referred to as normal picture recording, and a storage area 30 in the disk device 3 into which recording is conducted by the normal picture recording is referred to as normal channel (normal ch). A storage area 30 in the disk device 3 into which recording is conducted by the alarm picture recording is referred to as alarm channel (alarm ch).

FIG. 2 is a diagram showing recording contents of a disk device according to an embodiment of the present invention.

As shown in FIG. 2, the following mode is used because of physical restrictions of the recording capacity of the disk device 3. That is, in conducting the normal picture recording, image data is recorded into the normal channel at a low frame rate. In conducting the alarm picture recording, image data is recorded into the alarm channel at a high frame rate only when an alarm has occurred. As for the alarm picture recording, an image over a predetermined time period before alarm occurrence time (a pre-alarm image) is recorded by going back in time series from the alarm occurrence as indicated by "alarm channel" in FIG. 2.

Here, the case where the normal picture recording differs from the alarm picture recording only in the frame rate of recorded image data will be described as an example. In addition, however, it is possible to arbitrarily set recording contents in respective recording modes, such as a change in the compression factor or resolution of the image, according to the setting situation of the actual system. As another embodiment, it is possible to record image data at a higher frame rate, a lower compression factor or a higher resolution in the alarm picture recording than the normal picture recording.

FIG. 3 is a diagram showing operation of recording into a disk device according to an embodiment of the present invention.

A configuration of the web camera 5 and the image storage and delivery server 1 used when recording image data supplied from the web camera 5 in the storage areas 30-1 (ch1) and 30-2 (ch2) in the disk device 3 by using the normal picture recording or the alarm picture recording will now be described with reference to FIG. 3. For brevity, the configuration will now be described by taking the web camera 5-1 included in the web cameras 5 as an example.

The web camera 5-1 includes an image pickup unit 50, an encoder 51, a transmission video memory 52, a transmission video memory 52 (ring buffer) 53, and a network interface (I/F) 54.

The image storage and delivery server 1 includes a network interface (I/F) 10, a received video memories 11 (11-1 to 11-2), and a disk interface (I/F) 12. The web camera 5-1 and the image storage and delivery server 1 are connected to each other via the network I/Fs 54 and 10. The image storage and delivery server 1 and the disk device 3 are connected to each other via the disk I/F 12.

The image pickup unit 50 in the web camera 5-1 picks up an image of a predetermined visual field range. A video signal obtained by the image pickup is input to the encoder 51 at a frame rate of, for example, 30 fps, i.e., at time intervals of 30 frames per second. The encoder 51 conducts compression encoding on the video signal by using, for example, the JPEG form, and generates image data.

The image data encoded by the encoder 51 is input to the transmission video memory 52 at, for example, 30 fps, and stored in the transmission video memory 52 temporarily. If image data of one new frame is input from the encoder 51 to the transmission video memory 52, then the transmission video memory 52 discards image data stored until then and stores the new image data. When conducting the normal picture recording, a CPU (not illustrated) in the image storage and delivery server 1 transmits an image data delivery request to the web camera 5-1 in accordance with a normal picture recording rate (frame rate) preset in a data memory (not illustrated) in the image storage and delivery server 1.

Upon receiving the image data delivery request, the web camera 5-1 transmits image data of one frame stored in the transmission video memory 52 at that time point to the image storage and delivery server 1. In the case of the normal picture recording, the image storage and delivery server 1 sends the image data delivery request to the web camera 5-1 repetitively from picture recording start until picture recording end set by a user of, for example, client terminal 6-1. The image storage and delivery server 1 temporarily stores the received image data in the received video memory 11-1, and then records the image data in the storage area 30-1 (ch1) in the disk device 3 used as the normal channel of the web camera 5-1, via the disk I/F 12.

In the method adopted in the present embodiment, image data is delivered via the network 4 frame by frame whenever a request is issued. As another embodiment, a method of delivering image data corresponding to a plurality of frames (or image data corresponding to one file) in response to each request may also be adopted.

Furthermore, in the present embodiment, the image data output from the web camera 5 is intermittent and it is a moving picture that is consecutive in time series. However, a different form may be used.

In the system configuration of the pull type as in the present embodiment, the web camera 5 delivers image data in response to access (a delivery request) from the image storage and delivery server. As another embodiment, a system configuration of push type may also be used. In the system configuration of push type, the web camera 5 delivers image data at, for example, predetermined timing without access from the server 1.

The image data encoded by the encoder 51 is input to the transmission video memory 53 at an alarm picture recording rate (frame rate) preset for a data memory (not illustrated) in the web camera 5-1, and stored in the transmission video memory 53 temporarily. Unlike the transmission video memory 52, the transmission video memory 53 has a configuration capable of retaining image data corresponding to a plurality of frames such as 100 frames. This is because in the alarm picture recording it is necessary to record image data (pre-alarm image) over a predetermined time period before the alarm occurrence as described above.

If an external sensor (not illustrated) connected to the web camera 5-1 is activated and an alarm signal is input to the web camera 5-1, then an alarm occurrence notice is transmitted from the web camera 5-1 to the image storage and delivery server 1. Upon receiving the alarm occurrence notice, the CPU in the image storage and delivery server 1 starts alarm picture recording. When conducting the alarm picture recording, the CPU in the image storage and delivery server 1 specifies time that precedes alarm occurrence time by a predetermined time period and transmits an image data delivery request to the web camera 5-1. The web camera 5-1 transmits image data stored in the transmission video memory 53 beginning with the specified time to the image storage and delivery server 1.

The image storage and delivery server 1 temporarily stores received image data in the received video memory 11-2, and then stores the image data in the storage area 30-2 (ch2) in the disk device 3 used as the alarm channel for the web camera 5-1, via the disk I/F 12.

Transmission of image data from the web camera 5-1 to the image storage and delivery server 1 is continued until end of the alarm which has occurred. In other words, if the operation of the external sensor stops and an alarm end notice is transmitted from the web camera 5-1 to the image storage and delivery server 1, then the CPU in the image storage and delivery server 1 which has received the alarm end notice stops the image data delivery request.

Image data stored in the transmission video memory 53 is image data read out from the encoder 51 and stored in the transmission video memory 53 in accordance with the alarm picture recording rate by the CPU (not illustrated) in the web camera 5-1. In the case of the alarm picture recording, therefore, the CPU in the image storage and delivery server 1 does not perform a control concerning the frame rate when sending an image data delivery request to the web camera 5-1, but requests the web camera 5-1 to deliver all image data in the transmission video memory 53 for the time zone from the alarm occurrence to the alarm end (including the pre-alarm image), unlike the case of the normal picture recording.

As described above, the image data delivery request is stopped by transmission of the alarm end notice to the image storage and delivery server 1. Besides this mode, another mode may also be used as a different embodiment. For example, the image data delivery request is stopped a predetermined time period after the time when the image storage and delivery server 1 received the alarm occurrence notice (post-alarm picture recording).

For example, time information of the frame (hereafter referred to as time stamp), a frame number which indicates the order of image pickup in each channel, and frame rate information (the normal picture recording rate or the frame picture recording rate) are attached to the image data recorded in the storage area 30 in the disk device 3 as additional information.

The time stamp is generated by using the time when the image data is generated by the encoder 51 in the web camera 5 and the time when the image storage and delivery server 1 receives the image data from the web camera 5. For example, when generating the time stamp by using the time when the image storage and delivery server 1 receives the image data from the web camera 5, the time stamp may be calculated according to the technique described hereafter.

As an example, in the case of the normal picture recording, the time when image data is received is used as the time stamp of the image data. On the other hand, in the case of the alarm picture recording, there is a predetermined time period over which image data is retained in the transmission video memory 53. In such a case, for example, a difference between the time when the web camera 5 delivers the image data from the network I/F 54 and the time when the encoder 51 generates the image data is found, and the found difference is subtracted from the time when the image storage and delivery server 1 receives the image data. In the case of the alarm picture recording, therefore, a value obtained by the subtraction is used as the time stamp of the image data.

In the present embodiment, the normal picture recording rate is set by the image storage and delivery server 1, whereas the alarm picture recording rate is set by the web camera 5. However, it is possible to arbitrarily select setting destinations of these kinds of information according to the configuration of the actual system.

For example, if a memory for temporarily retaining image data corresponding to a plurality of frames, such as the transmission video memory 53 shown in FIG. 3, is not provided in the web camera 5, but provided in the image storage and delivery server 1, then the alarm picture recording rate may be set by the image recognition server 1.

The image reproduction method according to the present invention will now be described.

As the image reproduction method used when reproducing the image data of a predetermined web camera 5 recorded in the disk device 3, on the monitor of the client terminal 6, there are three image reproduction methods: "reproducing only the normal channel," "reproducing only the alarm channel," and "conducting seamless reproduction (which will be described in detail later)." For example, a GUI operation view for selecting one of these image reproduction methods is displayed on a display screen of the monitor of the client terminal 6. The user can select one of the image reproduction methods by depressing a button on an input device such as a mouse. Hereafter, these three image reproduction methods will be described in detail.

FIG. 4 is a diagram showing operation of "reproducing only the normal channel." In FIG. 4, the horizontal direction represents the time direction, and a picture recording time period in each channel is represented by a rectangle. A part represented by a thick line arrow in FIG. 4 is reproduced. The same is true of FIGS. 5 and 6 described later as well. When "reproducing only the normal channel," only image data recorded in a predetermined normal channel, such as the storage area 30-1 in the disk device 3 (the normal channel of the web camera 5-1), is read out in the order of time series and reproduced on the monitor of the client terminal 6, as shown in FIG. 4.

FIG. 5 is a diagram showing operation of "reproducing only the alarm channel." When "reproducing only the alarm channel," only image data recorded in a predetermined alarm channel (such as the storage area 30-2 in the disk device 3 (the alarm channel of the web camera 5-1)) is read out in the order of time series and reproduced on the monitor of the client terminal 6, as shown in FIG. 5.

As represented by a dotted line arrow in FIG. 5, reproduction is skipped over a time period having no image data. Video reproduction is continued over a time period having the next image data. In a configuration in which each image data is provided with a frame number indicating the order of image pickup when image data generated by the web camera 5 is recorded in the storage area 30 in the disk device 3, the client terminal 6 requests the image storage and delivery server 1 to deliver image data in the order of frame number. As a result, it is possible to implement the image reproduction method shown in FIG. 4 and FIG. 5.

FIG. 6 is a diagram showing operation of "seamless reproduction" according to an embodiment of the present invention. The "seamless reproduction" is an image reproduction method executed by the following algorithm as shown in FIG. 6. If image data is present in the alarm channel at certain time when reproducing the video image along the time series, then the image data in the alarm channel is reproduced regardless of whether image data is present in the normal channel. If image data is not present in the alarm channel but image data is present only in the normal channel, then the image data in the normal channel is reproduced. If image data is present in neither of the channels, it is also possible to skip until time when image data is present in either channel and continue reproduction of the image data.

The reason why reproduction of the image data in the alarm channel is provided with priority is as follows: as for a section in which image data is present in both the alarm channel and the normal channel as shown in FIG. 6, it is possible to ascertain contents in more detail by reproducing the image data in the alarm channel having the image data recorded at high frame rate.

In the system of the present embodiment, the frame rate and the image resolution and compression factor at the time when conducting the alarm picture recording and the normal picture recording can be arbitrarily set. When image data is present in both channels at the same time, therefore, it is possible to arbitrarily set a channel to be given priority in reproduction of image data according to the setting situation of the actual system. By the way, a decision whether image data is present in each channel at each time may be made by comparing reproduction reference time generated at the start time of reproduction of image data with the time stamp provided for image data taken out from each channel. Here, the reproduction reference time means, for example, a time axis serving as the reproduction reference.

FIG. 7 is a flow chart showing basic operation of image reproduction processing (seamless reproduction) 700 according to an embodiment of the present invention.

An example of a flow of image reproduction processing executed by the client terminal 6 will now be described with reference to FIG. 7.

In the image reproduction processing 700, the current system time (current time) is first stored in a data memory (not illustrated) included in the client terminal 1 as control time (step 701).

A time stamp of image data currently displayed on the monitor of the client terminal 6 is stored in the data memory as the reproduction reference time (step 702). The processing at the step 702 is processing for setting the reproduction start time of image data. Instead of the mode in which the time stamp of the image data currently displayed on the monitor of the client terminal 6 is used as the reproduction start time as described above, various modes may also be used as a different embodiment. For example, the user of the client terminal 6 is caused to specify the reproduction start time.

It is determined whether the client terminal 6 is currently acquiring image data of the alarm channel or the normal channel in the disk device 3 via the image storage and delivery server 1 (step 703). At step 709 described later, the client terminal 6 requests the image storage and delivery server 1 to deliver predetermined image data. Until the client terminal 6 finishes acquiring the image data, however, the processing does not branch to next step 704 (the decision at the step 703 is yes). If the client terminal 6 is not currently acquiring image data, the processing branches to the next step 704 (the decision at the step 703 is no).

Subsequently, the client terminal 6 calculates a difference between control time stored in the data memory and the current system time, and stores the calculated time in the data memory as "delay time" (step 704). After the client terminal 6 has found the delay time, it stores the current system time in the data memory as new control time, and updates the control time. Therefore, the delay time is time between the end of the processing at the step 704 in FIG. 7 and the re-start of the processing at the step 704.

Subsequently, the client terminal 6 adds the delay time calculated at the step 704 to the reproduction reference time stored in the data memory, and updates the reproduction reference time (step 705). The client terminal 6 can set the reproduction timing of image data in the client terminal 6 to the actual time elapse by conducting the processing at the step 705 of updating the reproduction reference time by means of the delay time and processing at step 708 described later.

Subsequently, the client terminal 6 acquires a frame number and a time stamp of the latest acquired image from a reproduced image memory for alarm channel and a reproduced image memory for normal channel (step 706).

The reproduced image memory will now be described. FIG. 8 is a diagram showing one configuration example of a reproduced image memory included in the client terminal 6. The reproduced image memory includes a reproduced image memory 81 for normal channel and a reproduced image memory 82 for alarm channel. Each of the memories 81 and 82 has an area for temporarily retaining image data corresponding to at least two frames, i.e., corresponding to one frame in a last acquired image storage area and one frame in a latest acquired image storage area. When conducting image reproduction processing shown in FIG. 7, the client terminal 6, which has received image data recorded in the alarm channel in the disk device 3 via the image storage and delivery server 1, stores the image data in the latest acquired image storage area in the reproduced image memory 82 for alarm channel. The same is true of the normal channel as well.

By the way, the client terminal 6 stores image data acquired last time in the last acquired image storage area in order to update the reproduced image memory at step 709 described later.

Subsequently, a time stamp of the latest acquired image in the reproduced image memory 82 for alarm channel and a time stamp of the latest acquired image in the reproduced image memory 81 for normal channel acquired at the step 706 are compared with the reproduction reference time (step 707). If at least one of the time stamps of the latest acquired images for alarm channel and for normal channel indicates time before the reproduction reference time (time earlier than the reproduction reference time), the processing branches to the step 708. On the other hand, if the time stamps of both the latest acquired images indicate time after the reproduction reference time (time later than the reproduction reference time), then the processing branches to step 711.

If the decision at the step 707 is yes, then the client terminal 6 calculates a frame number of image data to be acquired subsequently as to a channel in which the latest acquired image is judged to have a time stamp preceding the reproduction reference time at the step 707 (step 708). If the time stamp of the latest acquired image in both the alarm channel and the normal channel is judged to precede the reproduction reference time, then the client terminal 6 calculates a frame number of image data to be acquired subsequently in both channels.

Here, calculation of the frame number is conducted by using, for example, the delay time obtained at the step 704.

If the delay time is short in a configuration in which image data recorded in respective channels of the disk device 3 are provided with frame numbers in the order of time series, then image data to be acquired subsequently is image data in the next frame of the latest acquired image data currently retained by the client terminal 6 (in other words, a frame number of image data to be acquired subsequently is set equal to a number obtained by adding 1 to the frame number acquired at the step 706). On the other hand, if the delay time is long, then image data to be acquired subsequently is image data of three frames after the latest acquired image data currently retained by the client terminal 6 (in other words, a frame number of image data to be acquired subsequently is set equal to a number obtained by adding 3 to the frame number acquired at the step 706).

Specifically, if, for example, image data recorded in certain channel of the disk device 3 is 30 fps, then the frame number is increased by 1 at intervals of 33 msec. If the delay time obtained at the step 704 is 100 msec, then the delay time (100 msec) is divided by the frame interval (33 msec) and the quotient value 3 is added to the frame number of the latest acquired image data retained by the client terminal 6. This frame number is used as a frame number of image data for which the client terminal 6 sends a delivery request to the image storage and delivery server 1. As described above, as for frame rate information (having a frame interval of 33 msec in the above-described example) for calculating the frame number, for example, frame rate information retained by the latest acquired image data in the reproduced image memory as additional information can be used.

Subsequently, the client terminal 6 requests the image storage and delivery server 1 to deliver image data having the frame number calculated at the step 708 (step 709).

If the latest acquired image data judged to precede the reproduction reference time at the step 707 belongs to the alarm channel, then the client terminal 6 requests the image storage and delivery server 1 to deliver image data of the alarm channel at the step 709. If the latest acquired image data judged to precede the reproduction reference time belongs to the normal channel, then the client terminal 6 requests the image storage and delivery server 1 to deliver image data of the alarm channel at the step 709.

If the latest acquired image data judged to precede the reproduction reference time belongs to both the alarm channel and the normal channel, then the client terminal 6 requests both the alarm channel and the normal channel to deliver image data having the frame number calculated at the step 708, at the step 709. When requesting the image storage and delivery server 1 to deliver new image data, the client terminal 6 updates the reproduced image memory with respect to the channel for which the delivery request is conducted. For example, when the client terminal 6 issues a delivery request of new image data of the alarm channel at the step 709, image data stored in the latest acquired image storage area in the reproduced image memory 82 for alarm channel before that time is stored in the last acquired image storage area. And the image data for which the client terminal 6 has newly issued a delivery request at the step 709 is received from the image storage and delivery server 1, and then stored in the latest acquired image storage area in the reproduced image memory 82 for alarm channel.

Subsequently, the client terminal 6 selects image data to be reproduced on the monitor from the reproduced image memories 81 and 82, and outputs the image data to the monitor (step 710).

Details of the step 710 will be described later with reference to FIG. 9. In the present embodiment, the reproduced image selection processing at the step 710 is described as processing (step) in the flow chart shown in FIG. 7. Alternatively, the reproduced image selection processing may be executed independently with due regard to time required to draw the image data on the monitor.

If the time stamps of the latest acquired images in both channels of the client terminal 6 are judged to be after the reproduction reference time at the step 707, then the client terminal 6 does not issue a delivery request for new image data (the processing at the step 708), but stores a time stamp that indicates earlier time (time relatively in the past) in the latest acquired images in the reproduced image memories 81 and 82 respectively for alarm channel and normal channel, into the data memory as skip decision time (step 711).

Subsequently, the client terminal 6 makes a decision whether a difference between the skip decision time set at the step 711 and the reproduction reference time is at least 3 seconds (step 712). If the difference is at least 3 seconds, then the processing branches to step 713. If the difference is not at least 3 seconds, then processing at the step 713 is not conducted, but the processing branches to step 714.

If the decision at the step 712 is yes, then the client terminal 6 stores the skip decision time in the data memory as new reproduction reference time (step 713).

The 3 seconds is an example of a reference value for determining whether to skip the reproduction reference time by a predetermined time period, on the basis of a difference between the reproduction reference time and a time stamp of image data to be reproduced subsequently. The reference value may be set arbitrarily according to the setting situation of the actual system. For example, the client terminal 6 can skip a time zone during which image data is not present in the channel of the disk device 3, and reproduce image data, by setting this reference value equal to a suitable value. After the client terminal 6 has updated the reproduction reference time by using the skip decision time, the client terminal 6 may store the current system time in the data memory as new control time and update the control time.

Subsequently, the client terminal 6 makes a decision whether an image data reproduction stop order has been issued from the user of the client terminal 6. If a reproduction stop order is issued, then the image reproduction processing is terminated. If a reproduction stop order is not issued, then the processing branches to the step 703 (step 714).

An example of processing conducted at the step 710 shown in FIG. 7 will now be described in detail with reference to FIG. 9.

In the reproduced image selection processing (step 710), the client terminal 6 first compares the time stamp of the last acquired image in the reproduced image memory 81 for normal channel with the time stamp of the last acquired image in the reproduced image memory 82 for alarm channel (step 901).

If the time stamp of the last acquired image in the reproduced image memory 82 for alarm channel is judged to be later as a result of the comparison, then the processing branches to step 902. If the time stamp of the last acquired image in the reproduced image memory 82 for alarm channel is judged to indicate the same time as the time stamp of the last acquired image in the reproduced image memory 81 for normal channel does, then the processing branches to the step 902 in the same way. On the other hand, if the time stamp of the last acquired image in the reproduced image memory 81 for normal channel is judged to be later as a result of the comparison, then the processing branches to step 903.

If the decision at the step 901 is yes, then the client terminal 6 reads out the last acquired image from the reproduced image memory 82 for alarm channel, outputs the last acquired image to the monitor, and reproduces the image data (step 902). In the present embodiment, the time stamp of the image data stored in the last acquired image storage areas in the reproduced image memories 81 and 82 becomes time earlier (in the past) than the reproduction reference time, when conducting the processing at the step 710. Therefore, image data having a later time stamp included in the last acquired images for alarm channel and normal channel is image data at time closer to the reproduction reference time.

The reason why the processing branches to the step 902 even if the time stamp of the last acquired image in the reproduced image memory 82 for alarm channel is judged to indicate the same time as the time stamp of the last acquired image in the reproduced image memory 81 for normal channel does is that the image data in the alarm channel is to be reproduced when image data at the same time are present in the alarm channel and the normal channel, as mentioned above with FIG. 6.

If the decision at the step 901 is yes, then the client terminal 6 calculates a difference in time stamp between the latest acquired image and the last acquired image in the reproduced image memory 82 for alarm channel (step 903).

Subsequently, the client terminal 6 reads out frame rate information given to the last acquired image in the reproduced image memory 82 for alarm channel as additional information, and calculates an alarm continuation decision value (step 904). For example, if the frame rate information added to the last acquired image in the reproduced image memory 82 for alarm channel is 15 fps, then the frame interval is calculated as 66 msec. The client terminal 6 sets a value of 86 msec obtained by adding a margin value of, for example, 20 msec to 66 msec as the alarm continuation decision value.

Subsequently, the client terminal 6 compares the difference calculated at the step 903 with the alarm continuation decision value calculated at the step 904 (step 905). If the difference is found as a result of the comparison to be equal to or less than the continuation decision value, then the processing branches to the step 902. Because it can be determined whether the image data currently retained in the last acquired image storage area in the reproduced image memory 82 for alarm channel of the client terminal 6 is image data in a time period over which image data is consecutively recorded in the alarm channel of the disk device 3 at a predetermined frame rate, by comparing the alarm continuation decision value calculated on the basis of the frame rate information with the difference calculated at the step 903.

In other words, the client terminal 6 determines whether the retained image data is image data in a time period in which one alarm picture recording operation started by an alarm caused at certain time is continued, or image data at a boundary point between one alarm picture recording operation started by an alarm caused at certain time and another alarm picture recording operation started by an alarm caused at different later time. As a result, while one alarm picture recording operation is being continued, reproduction of image data in the normal channel is not conducted on the way, but reproduction of the image data in the alarm channel is given priority.

Even if, for example, the last acquired image in the normal channel is judged at the step 901 to be image data at time closer to the reproduction reference time than the last acquired image in the alarm channel, therefore, the processing branches to the step 902 and the last acquired image in the alarm channel is reproduced as long as one alarm picture recording operation is continued.

A concrete example of the processing shown in FIG. 9 will be described later with reference to FIG. 10A and FIGS. 11A to 11D. On the other hand, as a result of the comparison at the step 905, if the difference in time stamp is greater than the alarm continuation decision value, the processing branches to step 906.

If the decision at the step 905 is yes, then the client terminal 6 reads out the last acquired image from the reproduced image memory 81 for normal channel, outputs the last acquired image to the monitor, and reproduces the image data (step 906).

A concrete example of image reproduction processing described with reference to FIGS. 7 and 9 will now be described with reference to FIGS. 10A, 10B, 10C and FIGS. 11A to 11D.

FIG. 10A is a diagram showing an example of recording contents in the normal channel and the alarm channel of the disk device 3. With reference to FIG. 10A, image data of one web camera 5 is recorded in the normal channel at 4 fps, and image data of the web camera 5 is recorded in the alarm channel at 18 fps. As for the alarm channel, the case where alarm picture recording operation is conducted twice in total, once for frame numbers 1 to 7 and once for frame numbers 8 to 12 is shown.

In FIG. 10A, time indicated by a position of a left side of a square figure which indicates each image data is a time stamp that the image data has. Values such as 4 fps and 18 fps are value used for convenience of description. As described above, the normal picture recording rate and the alarm picture recording rate can be set arbitrarily according to the setting situation of the actual system. For example, if a camera for acquiring image data at 30 fps (at intervals of 33 msec) is used, it is suitable to set 30 fps, 15 fps, 10 fps, 6 fps, 5 fps, 3 fps, 2 fps, 1 fps or the like which becomes a multiple of 33 msec as the normal picture recording rate or the alarm picture recording rate.

In the case that the disk device 3 has recording contents as shown in FIG. 10A in the normal channel and the alarm channel, and that the client terminal 6 conducts the image reproduction processing shown in FIGS. 7 and 9, FIGS. 11 to 11D show recording contents in the reproduced image memory 81 for normal channel and the reproduced image memory 82 for alarm channel, and image data reproduced from them.

FIG. 11A shows the case where the reproduction reference time is located on t1. FIG. 11B shows the case where the reproduction reference time is located on t2. FIG. 11C shows the case where the reproduction reference time is located on t3. FIG. 11D shows the case where the reproduction reference time is located on t4. By the way, FIGS. 11A to 11D show states obtained immediately after the reproduced image selection processing at the step 710 in FIG. 7 has been conducted.

First, the case where the reproduction reference time is located on t1 will now be described. At the step 707 in FIG. 7, the time stamps of the latest acquired images (both having the frame number 2 in FIG. 10A) in the alarm channel and the normal channel at that time point coincide with the reproduction reference time t1. Therefore, the processing branches to the step 708. At the step 708, a frame number 3 is calculated as image data to be acquired subsequently, in both the alarm channel and the normal channel.

Subsequently, at the step 709, the client terminal 6 requests the image storage and delivery server 1 to deliver image data having the frame number 3 in the alarm channel and the normal channel. Subsequently, the client terminal 6 updates the reproduced image memories 81 and 82, and stores image data having the frame number 2 in the last acquired image storage areas, as shown in FIG. 11A. Image data having the frame number 3 which are requested to be delivered at the step 709 and which are currently being acquired via the image storage and delivery server 1 are stored in the latest acquired image storage areas.

Subsequently, in the reproduced image selection processing at the step 710, the time stamps of the last acquired images (both having the frame number 2 in FIG. 10A) in the alarm channel and the normal channel at that time point coincide with each other. Therefore, the decision at the step 901 in FIG. 9 is yes.

At the step 902, the last acquired image (having the frame number 2 in FIG. 10A) in the alarm channel is selected and output to the monitor.

The case where the reproduction reference time is located on t2 will now be described.

At the step 707 in FIG. 7, the time stamp of the latest acquired image (having the frame number 3 in FIG. 10A) in the alarm channel at that time point coincides with the reproduction reference time t2. Therefore, the processing branches to the step 708. At the step 708, a frame number 4 is calculated as image data to be acquired subsequently in the alarm channel.

Subsequently, at the step 709, the client terminal 6 requests the image storage and delivery server 1 to deliver image data having the frame number 4 in the alarm channel. The client terminal 6 updates the reproduced image memory 82, and stores image data having the frame number 3 in the last acquired image storage area, as shown in FIG. 11B. Image data having the frame number 4 which is requested to be delivered at the step 709 and which is currently being acquired via the image storage and delivery server 1 is stored in the latest acquired image storage area.

Subsequently, in the reproduced image selection processing at the step 710, the time stamp of the last acquired image (having the frame number 3 in FIG. 10A) in the alarm channel at that time point is later than the time stamp of the last acquired image (having the frame number 2 in FIG. 10A) in the normal channel. Therefore, the decision at the step 901 in FIG. 9 is yes.

At the step 902, the last acquired image (having the frame number 3 in FIG. 10A) in the alarm channel is selected and output to the monitor.

The case where the reproduction reference time is located on t3 will now be described.

At the step 707 in FIG. 7, the time stamp of the latest acquired image (having the frame number 3 in FIG. 10A) in the normal channel at that time point coincides with the reproduction reference time t3. Therefore, the processing branches to the step 708. At the step 708, a frame number 4 is calculated as image data to be acquired subsequently in the normal channel.

Subsequently, at the step 709, the client terminal 6 requests the image storage and delivery server 1 to deliver image data having the frame number 4 in the normal channel. The client terminal 6 updates the reproduced image memory 81, and stores image data having the frame number 3 in the last acquired image storage area, as shown in FIG. 11C. Image data having the frame number 4 which is requested to be delivered at the step 709 and which is currently being acquired via the image storage and delivery server 1 is stored in the latest acquired image storage area.

Subsequently, in the reproduced image selection processing at the step 710, the time stamp of the last acquired image (having the frame number 3 in FIG. 10A) in the normal channel at that time point is later than the time stamp of the last acquired image (having the frame number 6 in FIG. 10A) in the alarm channel. Therefore, the decision at the step 901 in FIG. 9 is no, and the processing branches to the step 903. At the time point t3, one alarm picture recording being constituted of the frame numbers 1 to 7 is continuing. At the step 905 subsequent to the steps 903 and 904, therefore, the difference in time stamp between the latest acquired image and the last acquired image in the alarm channel becomes smaller than the alarm continuation decision value. At the step 905, therefore, the decision is no.

At the step 902, the last acquired image (having the frame number 6 in FIG. 10A) in the alarm channel is selected and output to the monitor.

The case where the reproduction reference time is located on t4 will now be described.

At the step 707 in FIG. 7, the time stamp of the latest acquired image (having the frame number 4 in FIG. 10A) in the normal channel at that time point coincides with the reproduction reference time t4. Therefore, the processing branches to the step 708. At the step 708, a frame number 5 is calculated as image data to be acquired subsequently in the normal channel.

Subsequently, at the step 709, the client terminal 6 requests the image storage and delivery server 1 to deliver image data having the frame number 5 in the normal channel. The client terminal 6 updates the reproduced image memory 81, and stores image data having the frame number 4 in the last acquired image storage area, as shown in FIG. 11D. Image data having the frame number 5 which is requested to be delivered at the step 709 and which is currently being acquired via the image storage and delivery server 1 is stored in the latest acquired image storage area.

Subsequently, in the reproduced image selection processing at the step 710, the time stamp of the last acquired image (having the frame number 4 in FIG. 10A) in the normal channel at that time point is later than the time stamp of the last acquired image (having the frame number 7 in FIG. 10A) in the alarm channel. Therefore, the decision at the step 901 in FIG. 9 is no, and the processing branches to the step 903.

At the time point t4, one alarm picture recording operation for the frame numbers 1 to 7 is already finished. At the step 905 subsequent to the steps 903 and 904, therefore, the difference in time stamp between the latest acquired image and the last acquired image in the alarm channel becomes greater than the alarm continuation decision value. At the step 905, therefore, the decision is yes. At the step 906, the last acquired image (having the frame number 4 in FIG. 10A) in the normal channel is selected and output to the monitor.

In the case that the disk device 3 has recording contents as shown in FIG. 10A in the normal channel and the alarm channel and that the client terminal 6 conducts the image reproduction processing shown in FIGS. 7 and 9, FIG. 10B shows reproduction of resultant image data.

If image data is present in both the normal channel and the alarm channel at the same time as shown in FIG. 10B, then reproduction of the image data in the alarm channel is given priority. For example, since image data having the frame number 2 in the normal channel and the alarm channel have the same time stamp, reproduction of the image data having the frame number 2 in the alarm channel is conducted, whereas reproduction of the image data having the frame number 2 in the normal channel is not conducted. Furthermore, while alarm picture recording is continuing (i.e., while image data in the alarm channel are present consecutively at a predetermined frame rate), reproduction of image data of the frame numbers 3 and 6 in the normal channel is not conducted.

In the case that the disk device 3 has recording contents as shown in FIG. 10A in the normal channel and the alarm channel and that the client terminal 6 conducts other image reproduction processing obtained by modifying a part of the image reproduction processing shown in FIGS. 7 and 9, FIG. 10C shows resultant reproduced image data.

In FIG. 10C, the processing of the steps 903 to 905 shown in FIG. 9 is not conducted. If the decision at the step 901 is no, then the processing branches to the step 906. In other words, the processing of giving priority to the reproduction of the image data in the alarm channel during consecutive alarm picture recording is not conducted. Regardless of whether the channel is the alarm channel or the normal channel, therefore, reproduction of the image data is conducted in the order of time series. As shown in FIG. 10C, therefore, reproduction of the image data of the frame numbers 3 and 6 in the normal channel is also conducted. By the way, in FIG. 10C as well, image data having the frame number 2 in the normal channel which has the same time stamp as the image data having the frame number 2 in the alarm channel does is not reproduced.

When conducting alarm picture recording in the disk device 3, a table for managing contents of alarm picture recording as shown in FIG. 14 is generated for each web camera 5 as another implementation means of the image reproduction method according to the present invention. When conducting seamless reproduction, the client terminal 6 may refer to the table stored in the image storage and delivery server 1.

By referring to such a table, it is possible to previously grasp a time zone (between alarm picture recording start time and alarm picture recording end time) over which image data is recorded in the alarm channel of the disk device 3 and frame numbers (alarm picture recording start frame number to alarm picture recording end frame number) of image data in that time zone. By using an algorithm for reproducing image data recorded by normal picture recording in a time zone where image data obtained by alarm picture recording is not present, seamless reproduction in the client terminal 6 can be implemented.

If such an algorithm is used, as shown in the step 901 in the FIG. 9, it becomes unnecessary to conduct processing of comparing the time stamp in the alarm channel with the time stamp in the normal channel whenever reproducing image data corresponding to one frame.

The embodiment has been described by taking the case where image data is reproduced in the forward direction as an example. Although there is a processing difference as to whether the delay time is added to or subtracted from the reproduction reference time, it is also possible to implement the seamless reproduction by conducting similar processing in reproduction of the backward direction (from later time toward earlier time) as well.

If multiplied speed playback such as half speed playback, double speed playback or quadruple speed playback is conducted in forward reproduction, a configuration in which a result obtained by multiplying the delay time calculated at the step 704 and a multiplied speed coefficient (for example, 2 in the double speed playback) is added to the reproduction reference time to update the reproduction reference time at the step 705 in FIG. 7 may be used.

Furthermore, the case where a deviation quantity occurs between the time stamp of the image data in the normal channel and that in the alarm channel as shown in FIG. 10A has been described as an example. (For example, image data of the frame number 3 in the normal channel and image data of the frame number 6 in the alarm channel). As another embodiment, it is also possible to use a configuration in which occurrence of the deviation quantity is prevented by setting the normal picture recording rate and the alarm picture recording rate equal to a predetermined frame rate.

In the above-described embodiment, a mode of reproducing high frame rate image data by reproducing image data in the alarm channel preferentially is adopted. As another embodiment, however, it is also possible to use a mode of reproducing, for example, image data of low compression factor or image data of high resolution preferentially in the case where image data differing in frame rate, compression factor or resolution are recorded in the alarm channel and the normal channel.

In the above-described embodiment, a mode of forming the alarm channel and the normal channel on different storage areas of one disk device is used. As another embodiment, however, it is also possible to use a mode of forming the alarm channel and the normal channel in different disk devices.

Hereafter, the background of the technique concerning the present invention will be described. All items described here are not necessarily conventional techniques.

In the above-described example, the configuration for recording image data by using different channels, i.e., the normal channel and the alarm channel when conducting the normal picture recording and the alarm picture recording with respect to one web camera 5 is used. Hereafter, a configuration for recording image data in one channel when conducting the normal picture recording and the alarm picture recording will be described with reference to FIGS. 12 and 13.

FIG. 12 is a diagram showing an example of processing conducted when recording image data in one channel in the normal picture recording and alarm picture recording.

As shown in FIG. 12, the image storage and delivery server 1 records the video image of the web camera at a specified frame rate in a time period between time t0 and t2. If occurrence of an alarm is detected on the basis of an alarm signal input from an external sensor at the time t2, then the image storage and delivery server 1 acquires a video image of the web camera 5 from time t1 preceding the time t2 by a definite time period, and starts video recording.

The reason why the video image is recorded from the time t1 is to record the pre-alarm image as well. This video image has been buffered in an alarm video buffer (corresponding to, for example, the transmission video memory 53 shown in FIG. 3) of the web camera. The image storage and delivery server 1 overwrites the video image on the video image between t1 and t2 already recorded, and conducts time difference recording of a video image between t2 and t3 (which is referred to as time difference recording because a time series is traced back and a video image preceding the alarm occurrence time (i.e., the pre-alarm image) is also recorded unlike the normal picture recording).

By the way, it is supposed that continuation of the alarm signal input from the external sensor is completed and end of the alarm is detected, at time t3. Therefore, alarm picture recording of the video image of the web camera 5 ranging from time t1 to t3 finishes at time t4=t3+(t2−t1). In other words, the image storage and delivery server 1 records the video image ranging from t1 to t3 as alarm picture recording over a time period between t2 and t4. And the image storage and delivery server 1 resumes the video recording using the normal picture recording after the time t4.

Conducting the processing shown in FIG. 12 poses a problem that an unrecorded section (recording loss) is caused between t3 and t4. FIG. 13 is a diagram showing an example of processing for solving the recording loss shown in FIG. 12. In the processing shown in FIG. 13, a video image ranging from time t1 to t3 is recorded over a time period between t2 and t3. In other words, the recording interval is made shorter than usual to execute picture recording at high rate. However, the high rate picture recording has, for example, a problem (1) a time period over which one alarm picture recording operation continues cannot be predicted beforehand and a suitable shortening quantity of the recording interval cannot be calculated, because it cannot be known when an alarm which has occurred will finish. Such a problem can be avoided by determining a minimum value of an alarm picture recording continuation time period. However, this results in constraints on system construction. Furthermore, there is, for example, a problem (2) the processing load imposed on the image storage and delivery server 1 becomes greater than the normal time over the high rate picture recording. In other words, it becomes necessary to weave a load increase for high rate picture recording into the picture recording performance of the image storage and delivery server 1 as a margin. In addition, there is a possibility that alarm occurrences will come in from a plurality of web cameras 5 asynchronously, i.e., a possibility that a large number of alarms will occur at the same time. Therefore, it is necessary to add margins of load increases for respective alarms to calculate the performance specifications of the image storage and delivery server 1. This is inadvisable in performance specifications. As for picture recording in the time difference picture recording section, therefore, it is better to conduct picture recording at normal recording intervals while maintaining the time difference (FIG. 12) than the high rate picture recording (FIG. 13). There is also a method of always continuing the normal picture recording and the alarm picture recording in one channel while maintaining the time difference. However, a loss in the video image caused by sudden interruption of power supply is conceivable. A countermeasure such as installation of an UPS (Uninterruptible Power Supply) becomes necessary. A problem of, for example, a higher system cost also occurs.

On the other hand, in the configuration according to the embodiment of the present invention, the normal picture recording and the alarm picture recording are conducted using separate channels. For example, therefore, the problem described with reference to FIGS. 12 and 13 can be solved. By the way, a video image in the same time zone is redundantly recorded in, for example, two channels, i.e., the normal channel and the alarm channel. As compared with the configurations shown in FIGS. 12 and 13, therefore, an extra recording capacity becomes necessary. For example, in the case where recording of image data using the normal picture recording and that using the alarm picture recording are executed at the same time, however, the normal recording is executed at a low frame rate (for example, 1 fps) in many cases. As compared with the problem posed in the scheme described with reference to FIGS. 12 and 13, therefore, a serious problem is not posed.

As for the alarm picture recording, it is necessary to go back in time series and record the video image (pre-alarm image) preceding the alarm occurrence time. Therefore, it is difficult to make image data obtained by the normal picture recording and image data obtained by the alarm picture recording coexist in the same channel. In a configuration in which a video image of one web camera is stored in one channel in a time series manner and the video image of one web camera is divided into and stored in two channels such as the normal channel and the alarm channel, the configuration of the recording system can be simplified. By the way, it is also possible to use a configuration in which the video image of one web camera is divided into and stored in three or more channels.

Furthermore, according to the image reproduction method (seamless reproduction) of the present invention, it is possible to, for example, reproduce recorded video images of two kinds generated from one camera on one reproduction screen as if they are one video stream for the user.

The configuration for the image reproduction method according to the present invention is not restricted to the configurations heretofore described, but various configurations may be used.

By the way, it is also possible to provide the present invention as, for example, a method or a scheme for executing the processing according to the present invention, or a program for implementing such a method or a scheme. It is also possible to provide the present invention as various apparatuses, such as an image reproduction apparatus, or systems.

Application fields of the present invention are not restricted to those described heretofore, but the present invention can be applied to various fields. For example, the embodiment has been described by taking the video image generated by the camera in the surveillance system as an example, but the application field of the present invention is not limited to this. For example, it is also possible to handle a video image concerning a movie or a TV program.

As for various kinds of processing conducted in the image reproduction method according to the present invention, for example, a configuration controlled by causing a processor to execute a control program stored in a ROM (Read Only Memory) in hardware resources including the processor and the memory may be used. A configuration of a hardware circuit in which, for example, respective function means for executing the processing are independent may also be used.

Furthermore, it is also possible to grasp the present invention as a computer-readable recording medium, such as a floppy (trade mark) disk or a CD (Compact Disc)-ROM, storing the control program and a control program (itself). It is possible to perform the processing according to the present invention by inputting the control program from the recording medium to the computer and causing the processor to execute the control program.

The embodiment has been described. However, the present invention is not limited to the embodiment. It is evident to those skilled in the art that various changes and modification can be effected without departing from the spirit of the present invention and appended claims.

INDUSTRIAL APPLICABILITY

The present invention can be utilized as, for example, a method or a scheme for executing processing according to the present invention, or a program for implementing such a method or scheme. Furthermore, it is also possible to utilize the present invention as various apparatuses, such as the image reproduction apparatus, and various systems.

BREIF DESCRIPTION OF THE DRAWINGS

FIG. 11A is a diagram showing an example of recording contents and reproduction contents according to an embodiment of the present invention;

FIG. 11B is a diagram showing an example of recording contents and reproduction contents according to an embodiment of the present invention;

FIG. 11C is a diagram showing an example of recording contents and reproduction contents according to an embodiment of the present invention;

FIG. 11D is a diagram showing an example of recording contents and reproduction contents according to an embodiment of the present invention;

FIG. 14 is a diagram showing an example of a table for managing recording contents according to an embodiment of the present invention.

DESCRIPTION OF REFERENCE NUMERALS

Figure 1:
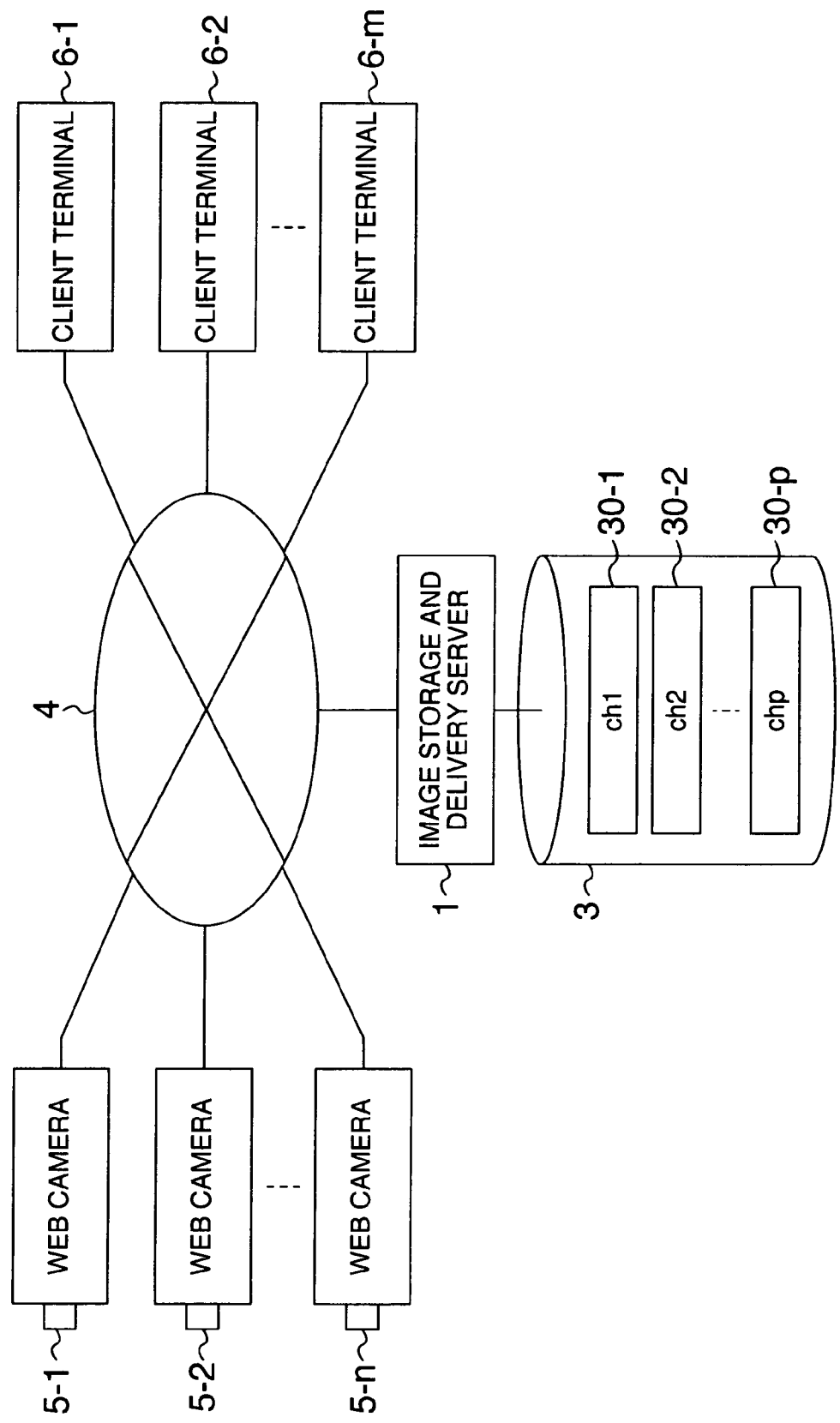
FIG. 1 is a diagram showing a general configuration of an image storage and delivery system according to an embodiment of the present invention.
Figure 2:
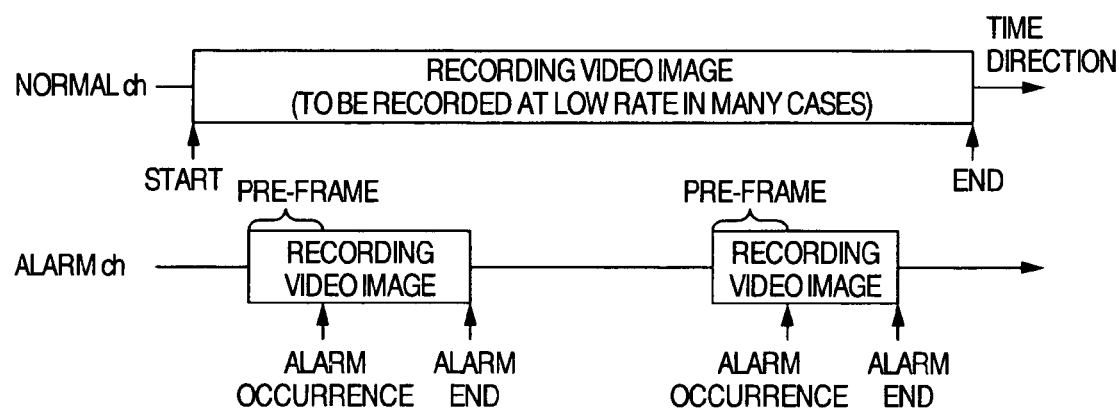
FIG. 2 is a diagram showing recording contents of a disk device according to an embodiment of the present invention.
Figure 3:
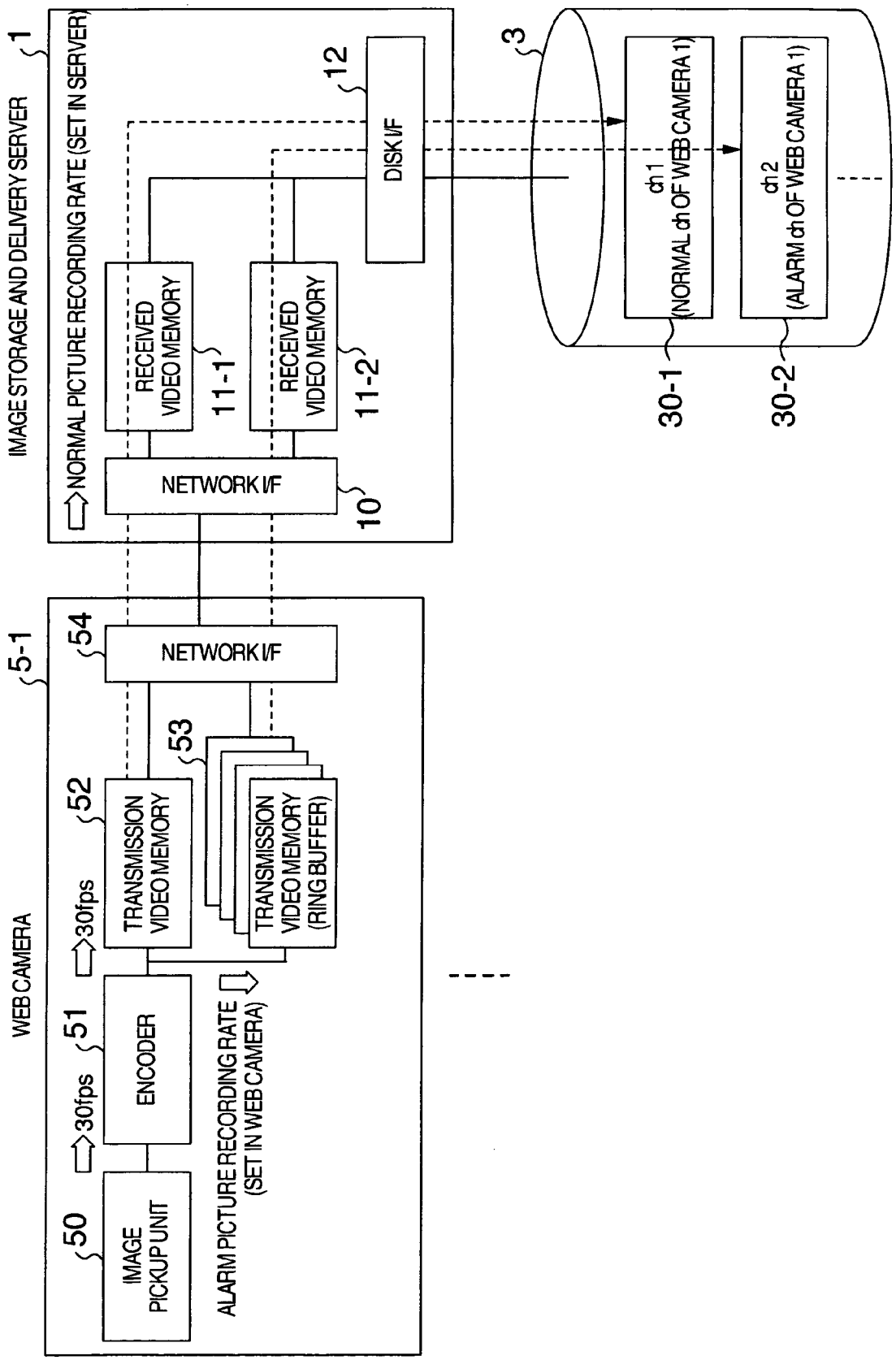
FIG. 3 is a diagram showing operation of recording into a disk device according to an embodiment of the present invention.
Figure 4:
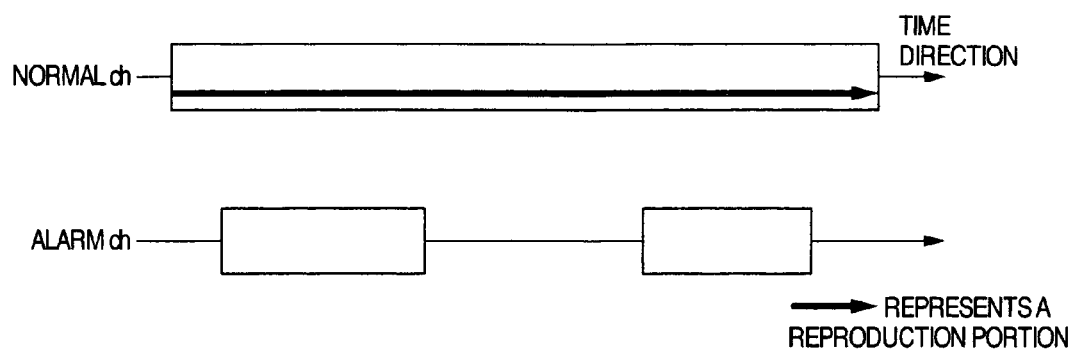
FIG. 4 is a diagram showing image reproduction processing according to an embodiment of the present invention.
Figure 5:
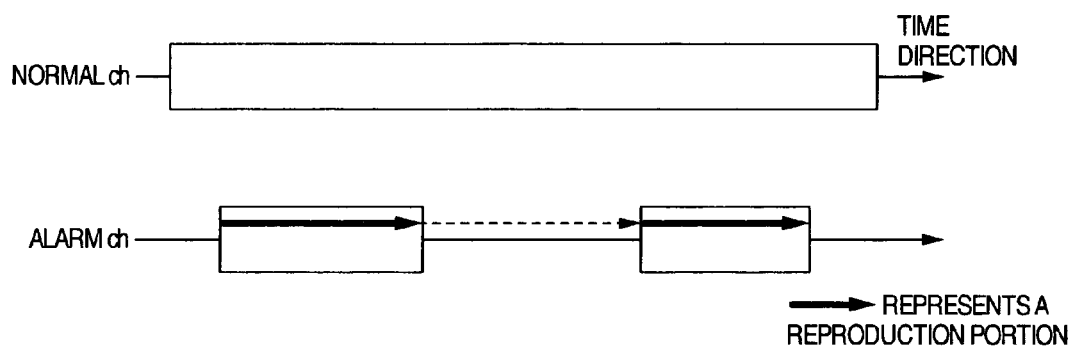
FIG. 5 is a diagram showing image reproduction processing according to an embodiment of the present invention.
Figure 6:
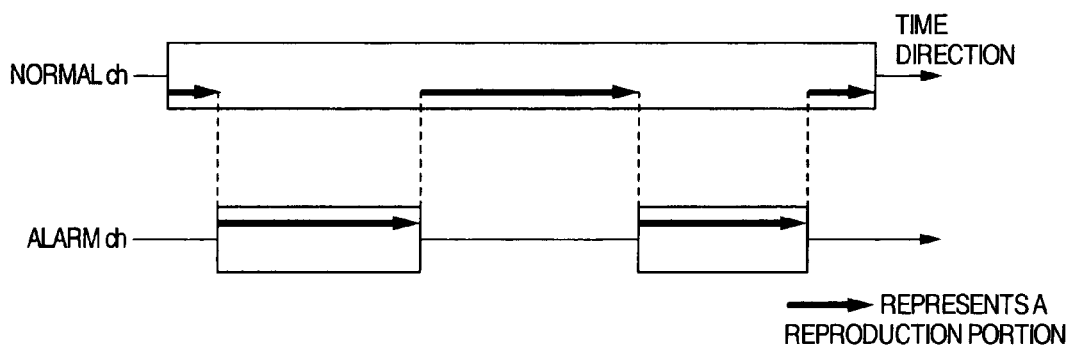
FIG. 6 is a diagram showing image reproduction processing according to an embodiment of the present invention.
Figure 7:
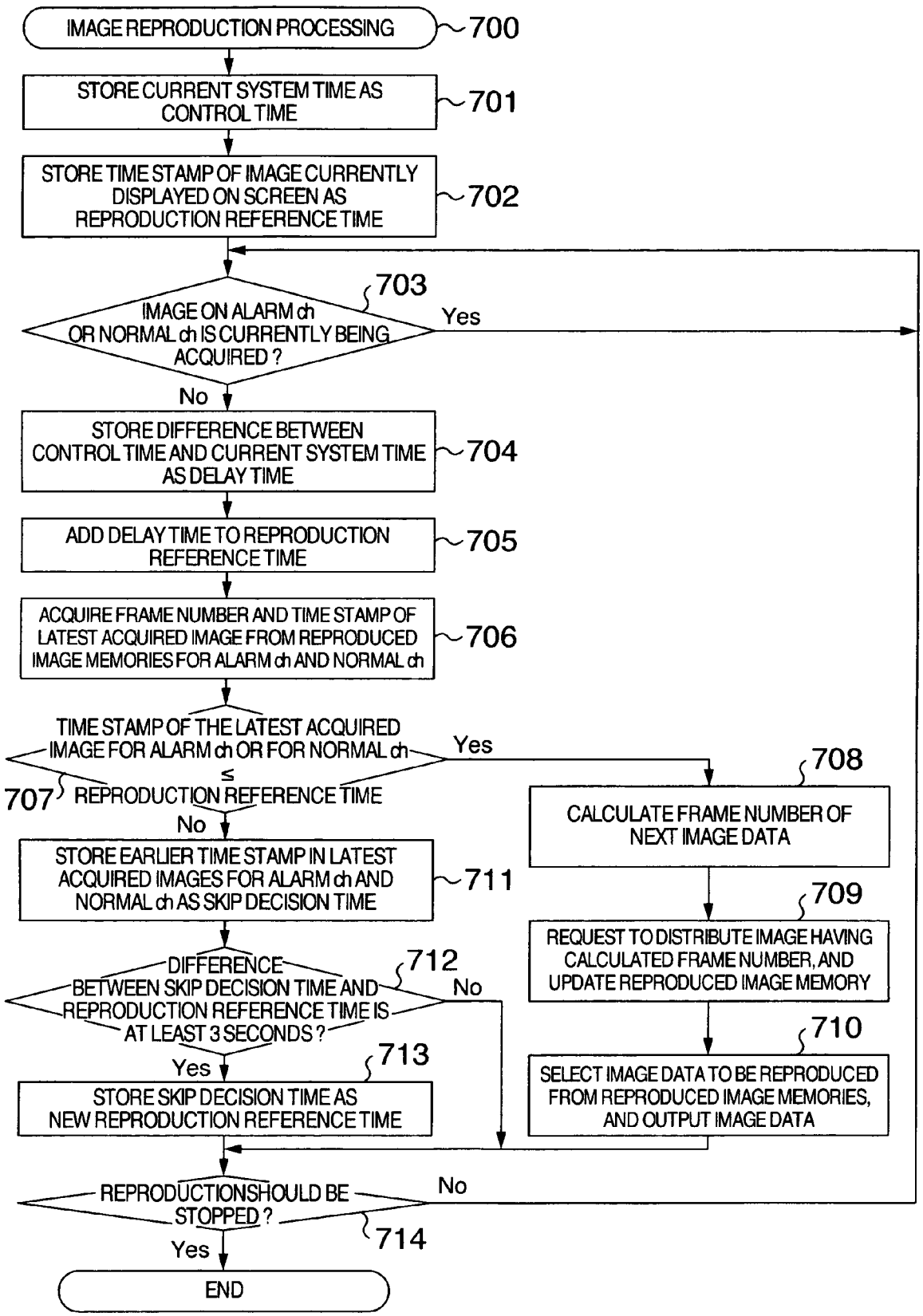
FIG. 7 is a flow chart showing image reproduction processing according to an embodiment of the present invention.
Figure 8:
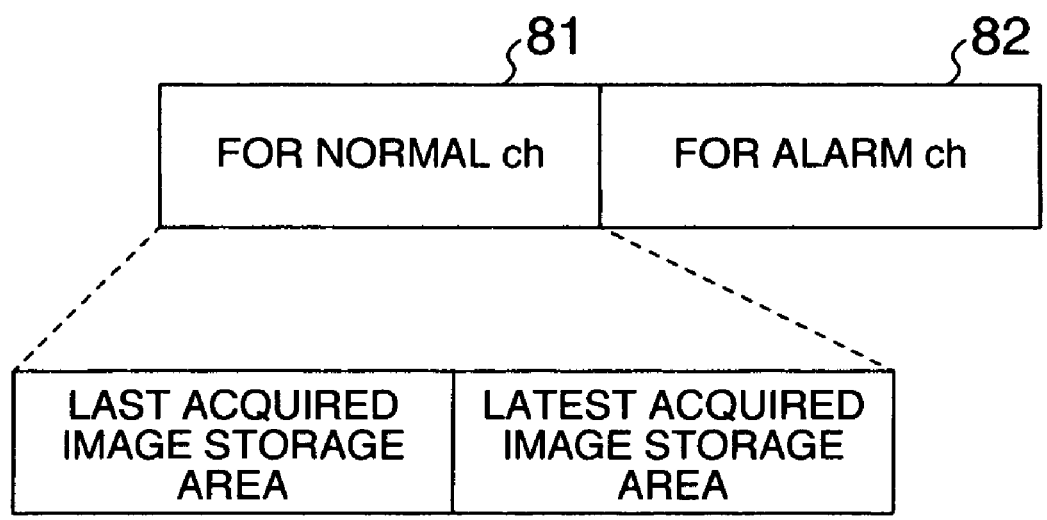
FIG. 8 is a diagram showing a configuration of a memory area according to an embodiment of the present invention.
Figure 9:
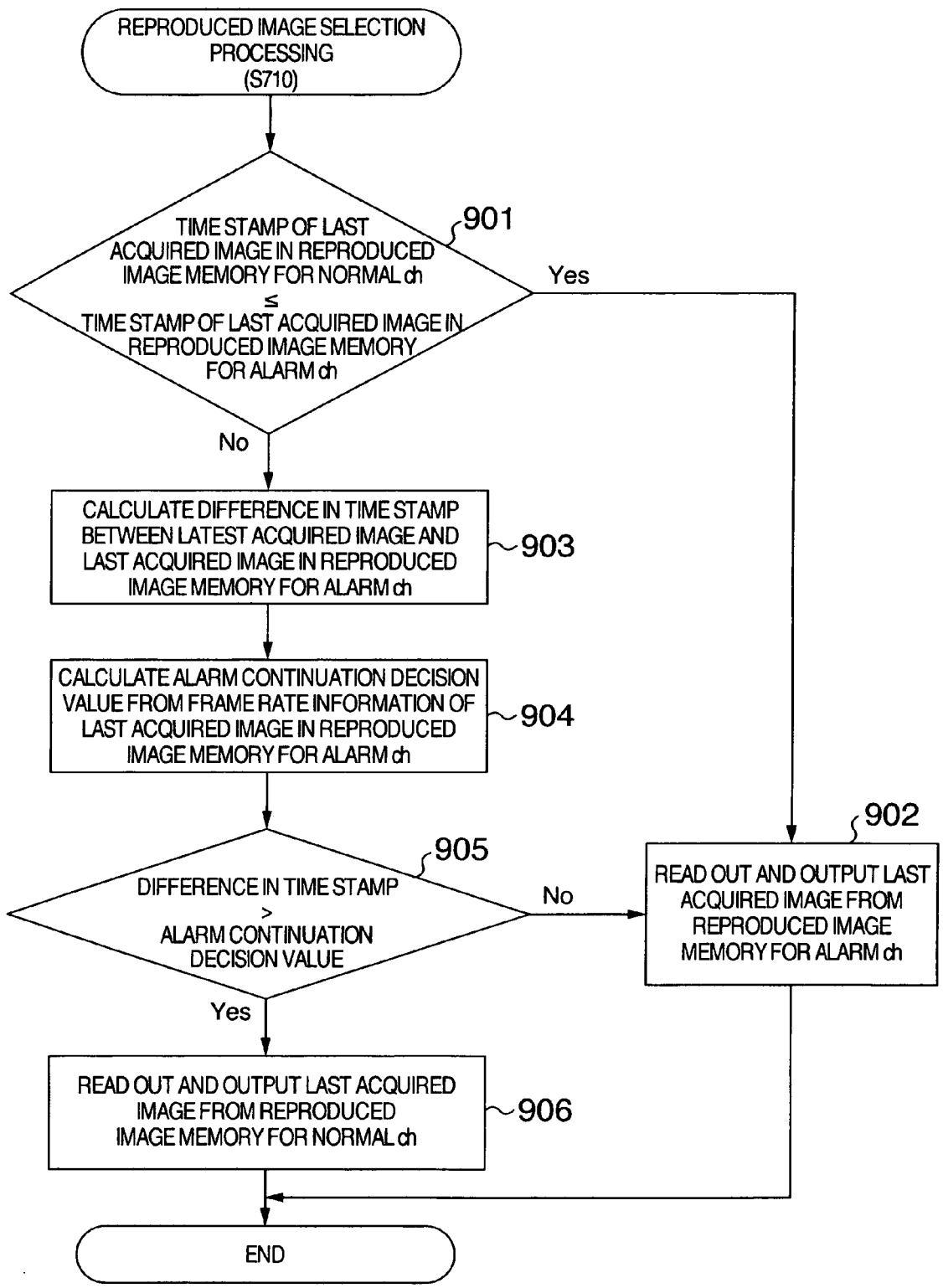
FIG. 9 is a flow chart showing image reproduction processing according to an embodiment of the present invention.
Figure 10A:
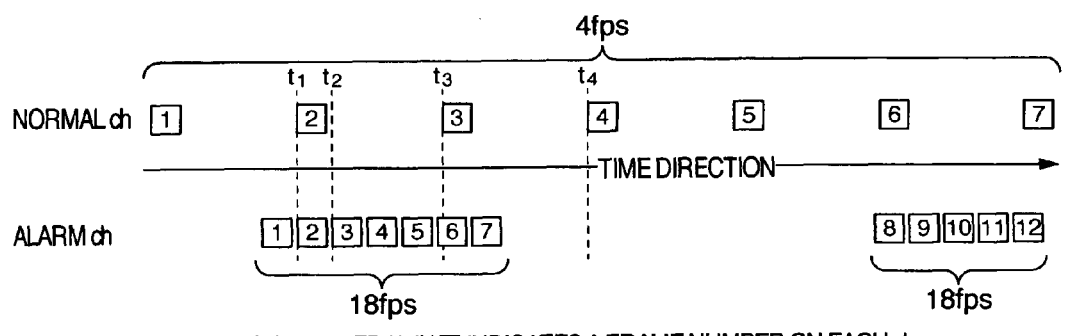
FIG. 10A is a diagram showing an example of recording contents and reproduction contents according to an embodiment of the present invention.
Figure 10B:
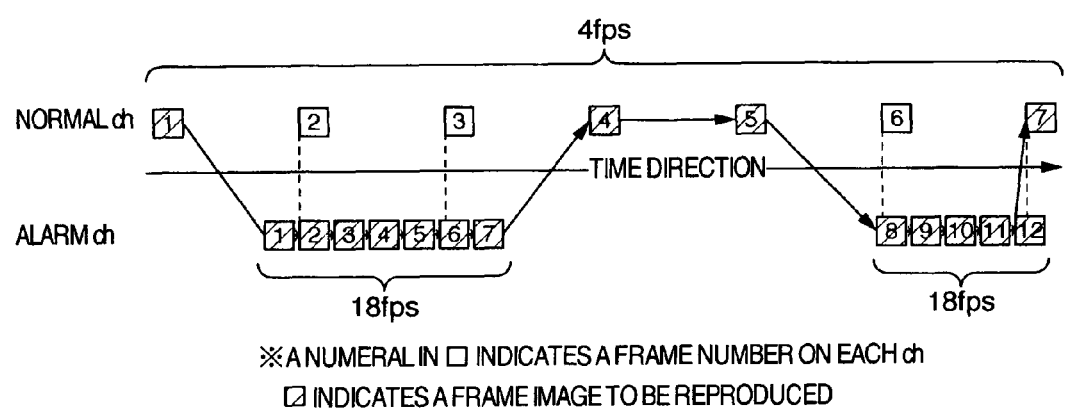
FIG. 10B is a diagram showing an example of recording contents and reproduction contents according to an embodiment of the present invention.
Figure 10C:
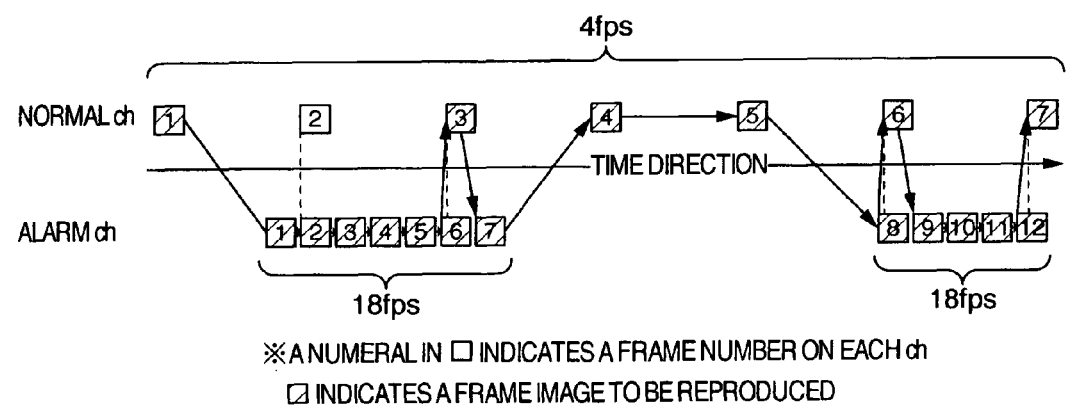
FIG. 10C is a diagram showing an example of recording contents and reproduction contents according to an embodiment of the present invention.
Figure 12:
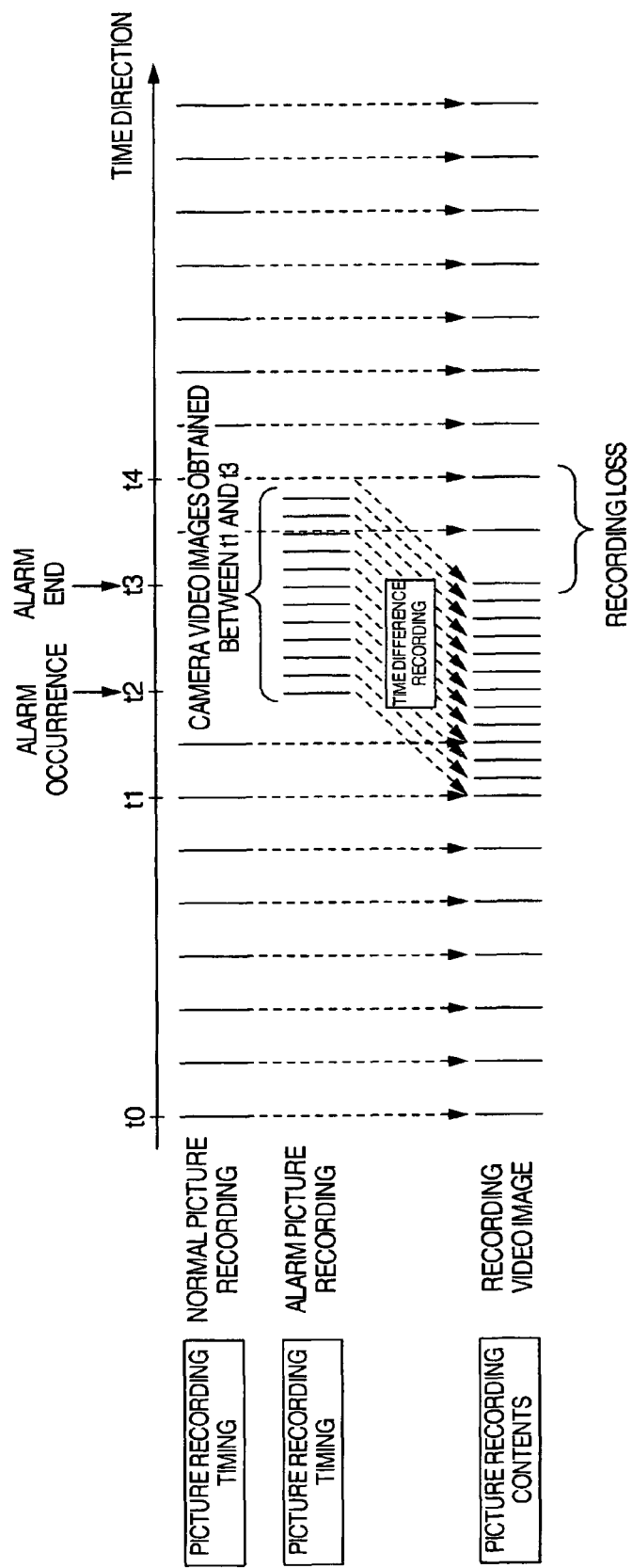
FIG. 12 is a diagram showing an example of processing in the case where recording using different recording modes is conducted in one channel according to an embodiment of the present invention.
Figure 13:
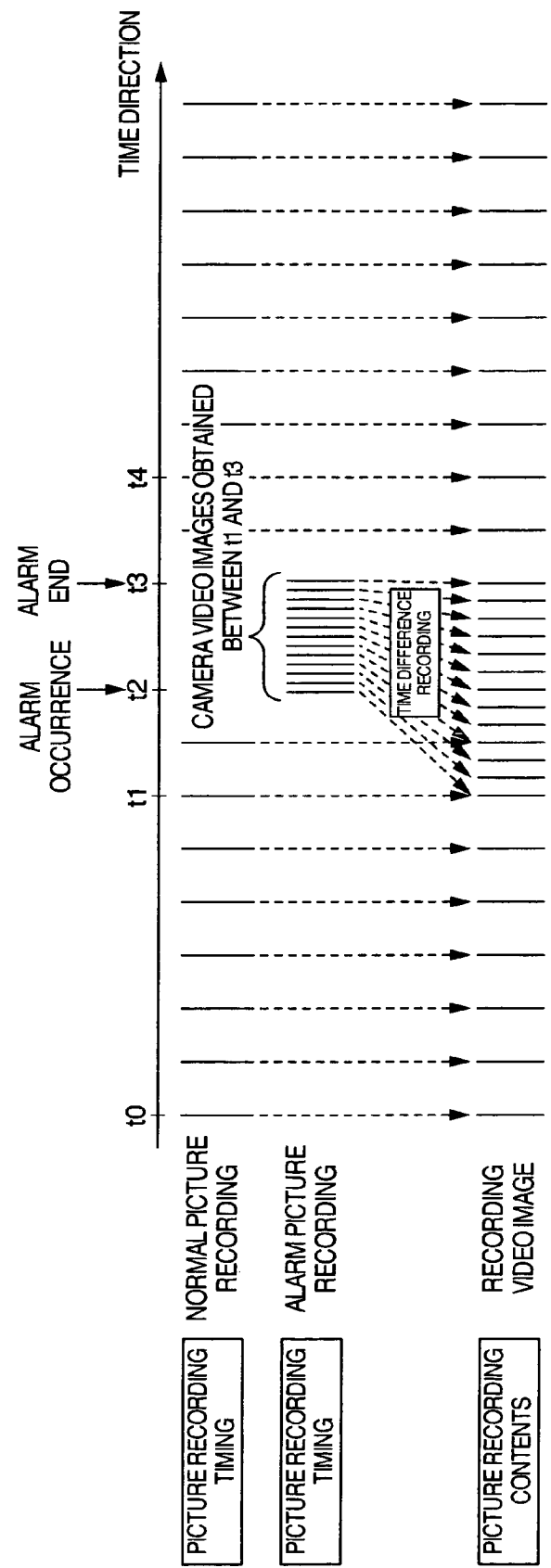
FIG. 13 is a diagram showing an example of processing in the case where recording using different recording modes is conducted in one channel according to an embodiment of the present invention.

1: Image storage and deliver server
3: Disk device
4: Network
5: Web camera
6: Client terminal
30: Storage area

The invention claimed is:

1. An image storage and delivery method for recording and reproducing image data from a web camera via a network, the method comprising:
a first temporarily storing step of temporarily storing, by the web camera, images in a memory, wherein the web camera takes the images consecutively in time-series;
a normal recording step of intermittently receiving, by a storage server, image data from the memory,
wherein the storage server records the image data in a first recording channel of a disk device as first data with a first image quality along with time stamps;
a second temporarily storing step of temporarily storing, by the web camera, predetermined frames of the images taken by the web camera as second data with a second image quality in a ring buffer memory, and
a delivering step of delivering, by the storage server, image data to the client terminal in IP-packet form, wherein the client terminal requests the image data by specifying a channel and a frame number,
wherein in response to an alarm, the storage server performs:

a requesting step of requesting the web camera to deliver the second data representative of at least one of the images taken before the alarm occurred, and an alarm recording step of recording the second data from the ring buffer memory in a second recording channel of the disk device with the second image quality along with time stamps without stopping the normal recording step, whereby the recorded second data has a higher frame rate than the first data, and a recording period of the second data and a recording period of the first data overlap in an overlapping period, and wherein in response to an instruction for seamless playback, a client terminal performs a reproduction step of receiving both of the first data and the second data of the overlapping period, selecting frames, frame by frame, from the first data and the second data, and reproducing the selected frames along with the time stamps of the selected frames as a continuous video, wherein the reproduction step repeats:
a substep of adding an elapsed time from a reproducing start time to a reproduction reference time;
a substep of updating a reproducing memory which holds a latest acquired frame and a previous acquired frame for each of the first data and the second data received from the storage server,
wherein the updating is performed when a time stamp of a latest acquired frame of either the first data or the second data indicates a time older than the reproducing reference time, by acquiring and receiving a next frame of the latest acquired frame with the older time stamp; and
a substep of comparing the time stamps of the previous acquired images of the first data and the second data to output either data as a reproducing data, having a newer time, of the first data and the second data.

2. The image storage and delivery method according to claim 1,
wherein image quality indicates at least one of a frame rate, a compression factor, and a resolution.

3. The image storage and delivery method according to claim 2, wherein the first data and the second data from the web camera are compressed by the web camera in an IP (Internet Protocol) packet form.

4. The image storage and delivery method according to claim 3, wherein the first data and the second data from the web camera include still images compressed in a JPEG (Joint Photographic Experts Group) format or a corresponding format, and the first data and the second data are recorded in a format for recording the image data intermittently.

5. An image storage and delivery system for recording and reproducing image data comprising:
a web camera;
a storage server; and
a client terminal,
wherein the web camera comprises:
an encoder compressing and encoding images taken by the web camera at a predetermined frame rate and outputting the encoded compressed signal as image data;
a memory storing a latest one frame of the outputted image data or a plurality of frames of the outputted image data which are intermittently recorded; and
a ring buffer memory retaining the outputted image data over a predetermined time period at an alarm recording rate,
wherein the storage server:

requests the web camera to deliver image data in the memory;
intermittently records the image data received from the memory as first image data with a first image quality and time stamps in a first recording channel when image data is transmitted from the memory based on the request for delivery of the first image data or based on a predetermined timing; and
delivers image data to the client terminal in IP-packet form, wherein the client terminal requests the image data by specifying a channel and a frame number,
wherein in response to an alarm, the storage server:
requests the web camera to deliver second image data, which is in the ring buffer memory and representative of images taken before the alarm occurred, and
records the second image data received from the ring buffer memory with a second image quality and a time stamp in second recording channel without stopping intermittently recording the first image data when the image data is transmitted from the ring buffer memory based on the request for delivery of the second image data, whereby the received second image data represents images taken before the alarm occurred and has a higher frame rate than the first image data, and a recording period of the second image data and a recording period of the first image data are overlap in an overlapping period, and
wherein in response to an instruction for seamless playback, a client terminal performs a reproduction step of receiving both of the first data and the second data of the overlapping period, selecting frames, frame by frame, from the first data and the second data, and reproducing the selected frames along with the time stamps of the selected frames as a continuous video,
wherein the reproduction step repeats:
a substep of adding an elapsed time from a reproducing start time to a reproduction reference time;
a substep of updating a reproducing memory which holds a latest acquired frame and a previous acquired frame for each of the first data and the second data received from the storage server,
wherein the updating is performed when a time stamp of a latest acquired frame of either the first data or the second data indicates a time older than the reproducing reference time, by acquiring and receiving a next frame of the latest acquired frame with the older time stamp; and
a substep of comparing the time stamps of the previous acquired images of the first data and the second data to output either data as a reproducing data, having a newer time, of the first data and the second data.

6. The image storage and delivery system according to claim 5, wherein the client terminal:
determines whether a time stamp of a second latest acquired image in a reproduced image memory for a normal channel is later than a time stamp of a second latest acquired image in a reproduced image memory for an alarm channel;
calculates a difference in time stamp between the latest acquired image and the second latest acquired image in the reproduced image memory for the alarm channel, if the time stamp of the last acquired image in the reproduced image memory for the normal channel is determined to be later;
calculates a continuation-decision value based on frame rate of the last acquired image in the reproduced image memory for the alarm channel;

compares the difference calculated with the alarm continuation-decision value calculated;

outputs the last acquired image in the reproduced image memory for an alarm channel to a monitor if the difference is equal to or less than the continuation-decision value or the time stamp of the last acquired image in the reproduced image memory for the alarm channel is determined to be later; and if the difference is greater than the continuation-decision value, then the client terminal reads the last acquired image from the reproduced image memory for the normal channel, outputs the last acquired image to the monitor, and reproduces the image data.

* * * * *